J. R. MEYERS.
PROCESS FOR FORMING CHEESE.
APPLICATION FILED DEC. 17, 1920.
1,415,942.
Patented May 16, 1922.
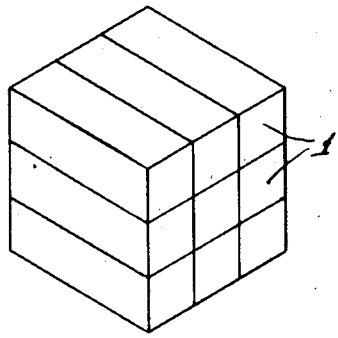
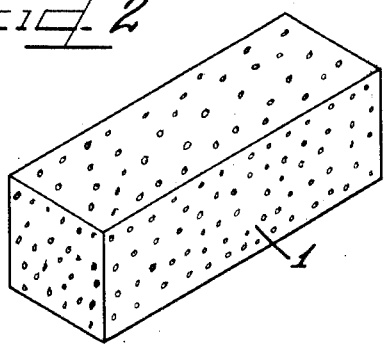
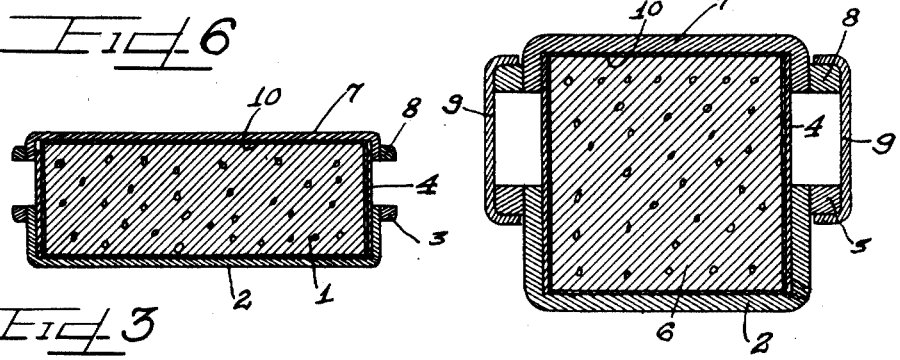
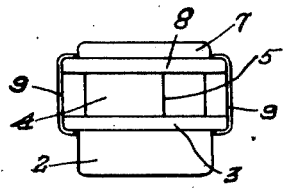
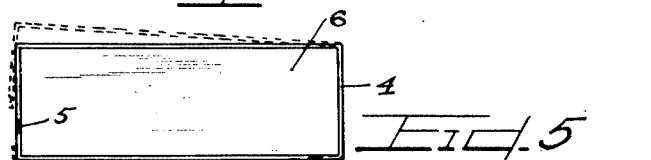
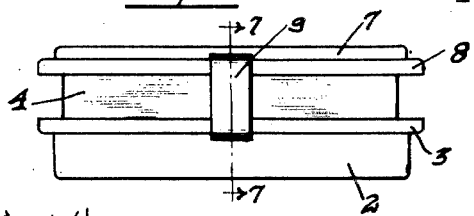
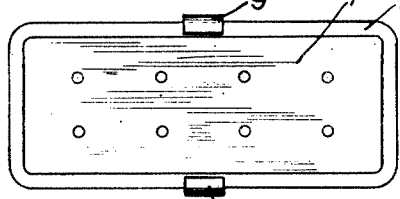
Witnesses
Rudolph T. Berg.
Charles W. Hill Jr.
Inventor
Julius R. Meyers.
By Charles W. Hill
Atty.

UNITED STATES PATENT OFFICE.

JULIUS R. MEYERS, OF GLENCOE, ILLINOIS.

PROCESS FOR FORMING CHEESE.

1,415,942.  Specification of Letters Patent.  Patented May 16, 1922.

Application filed December 17, 1920. Serial No. 431,453.

*To all whom it may concern:*

Be it known that I, JULIUS R. MEYERS, a citizen of the United States, and a resident of the city of Glencoe, in the county of Cook and State of Illinois, have invented certain new and useful Improvements in a Process for Forming Cheese; and I do hereby declare that the following is a full, clear, and exact description of the same, reference being had to the accompanying drawings, and to the numerals of reference marked thereon, which form a part of this specification.

It has been the custom in making cheese to initially place curds within a large press or mold and for a period of from eight to twelve hours gradually or from time to time increase the pressure to press out the whey and thus form a large green cheese. The green cheese is then removed from the large press or mold and cut into a plurality of pieces to form small cheeses. The small cheeses are then placed in the same press but is smaller molds and are thus permitted to remain in the large press for a long period of from eight to twelve hours or longer if necessary to allow the small cheeses to be properly formed, after which the small cheeses are removed from the large press and set away to be cured. By this arrangement it will be noted that the large presses are not permitted to be re-used for a considerable length of time thereby requiring a large number of large presses to be used when large quantities of cheese are to be manufactured.

To obviate the use of a large number of large presses and thereby considerably reduce the cost of manufacture of small cheeses, it is the purpose of this invention to provide an improved process for forming cheeses wherein the finishing of small cheeses is not accomplished by the use of the large original presses but instead by the use of a hydraulic or other suitable press which is used to press small molds individually.

It is an object of this invention to provide a process for forming small cheeses by cutting a large green cheese into a plurality of pieces and individually pressing said pieces within individual small molds which are later subjected to heat for a short period to expand the cheese therein to fill out the surface irregularities to form a small cheese having smooth even surfaces.

Another object of the invention is to provide a process of finishing small cheeses by utilizing heat to eliminate surface irregularities.

A further object of the invention is to provide a process whereby pieces of green cheese pressed to predetermined sizes within individual molds are first subjected to heat for a short period to smooth out the cheese surfaces and then permitted to gradually cool in said molds before being removed and set away to cure.

It is an important object of this invention to provide a process of forming small individual cheeses with smooth surfaces by expanding compressed cheeses by the application of heat to small individual cheese molds.

Other and further important objects of this invention will be apparent from the disclosures in the drawings and the accompanying specification.

My invention (in a preferred form) is illustrated in the drawings and hereinafter more fully described.

On the drawings:

Figure 1 is a perspective view of a compressed block of green cheese.

Figure 2 is a perspective view of an enlarged piece of green cheese cut from said block.

Figure 3 is an end view of a small individual cheese mold.

Figure 4 is a side elevation thereof.

Figure 5 is a top plan view of the cheese mold.

Figure 6 is a longitudinal section taken through a mold before the piece of cheese within the mold is compressed.

Figure 7 is an enlarged transverse section taken on line 7—7 of Figure 4.

Figure 8 is a top view of a split sleeve or collar showing the expansibility thereof in dotted lines to permit removal thereof from a finished cured cheese.

As shown on the drawings:

For the purpose of carrying out the improved process of this invention, Figure 1 illustrates a large block of green cheese cut into a plurality of pieces 1 of predetermined size to be compressed in an individual mold shown in Figures 3 to 7 inclusive. The mold comprises a chambered apertured base or pan 2 having a peripheral flange 3 integrally formed thereon or welded thereto. Removably seated in the mold base 2 is a hoop, band or sleeve 4 split at 5 to permit expansion of the hoop as illustrated in dotted lines in Figure 8. For the purpose of compressing a piece of green cheese 1 into the mold hoop 4 to form a small cheese 6 of a predetermined size a chambered apertured mold top or cover 7 is provided to engage over a projecting piece of green cheese disposed within the hoop 4 and projecting thereabove as shown in Figure 6. The cover also engages around the upper projecting portion of the hoop 4 and is provided with a peripheral flange 8. The piece of cheese as shown in Figure 6 is of a height greater than the height of the mold hoop 4 to permit proper compression of the piece of cheese into the hoop when the cover 7 is forced downwardly on said hoop toward the mold base 2. Channel clamps or locking members 9 are provided to fit over the mold flanges 3 and 8 to removably hold the mold cover locked in its depressed position to the mold base. If desired each piece of cheese may be invested with cheese cloth 10 or with a similar covering.

The improved process of forming a cheese is very simple and is accomplished as follows: A brick or block of green cheese is first formed in a large cheese press or mold by external pressure and is then removed from the press to permit re-use of the press for making another batch of green cheese. The removed block of green cheese is then cut up into a number of pieces 1 each of a predetermined size as shown in Figures 1 and 2. Each piece of green cheese 1 thus cut from the block has a number of cavities or irregularities in the various surfaces thereof. It is one of the purposes of this invention to form a finished small cheese of a predetermined size having smooth even surface.

A piece of green cheese 1 is first enclosed by a split hoop 4 which is then inserted into the mold base 2. The piece of cheese 1 as shown in Figure 6 is of a greater height than the hoop. The height of the hoop being equal to the height of a finished cheese. The hoop and cheese project above the top of the mold base 2. The size of the hoop 4 is such that when put in place it fits closely within the mold base with the split edges abutting each other to form a tight joint. The apertured cover 7 is next engaged over the projecting portion of the green cheese and is pressed down by a hydraulic press or any suitable means over the hoop 4 to compress the projecting part of the green cheese into the hoop. The clamps 9 are then engaged over the mold flanges 3 and 8 to hold the cover 7 locked with the base 2, as illustrated in Figures 3 and 4. The compressed cheese within the locked mold is of the desired size corresponding exactly to the dimensions of the interior of the expansible hoop.

The filled individual mold is now inserted in a bath of hot water having a temperature of approximately 110° to 115° F. and allowed to remain in said bath for a comparatively short period, say about one or two minutes or less depending upon the temperature of the water. If desired the filled mold may be placed in a room filled with moist air or steam at a temperature from about 110° to 120° F. for about five minutes. The steam is then turned off and the cheese allowed to cool slowly in the mold pan twelve to fourteen hours. The heating of the green cheese within a mold acts to expand the cheese thereby causing an outward pressure resulting in filling out all of the cavities and irregularities in the surfaces of the cheese. An individual small cheese of a predetermined size having smooth outer surfaces is thus produced.

After the filled mold is subjected to a hot water bath as hereinbefore described to expand the cheese within the mold to provide a cheese with smooth surfaces, the cheese is permitted to remain in said mold and gradually cool. After the heating of a cheese for a short period and the cooling thereof in an individual mold for a period of about twelve hours, the cheese is removed from the mold and split hoop and set away to cure.

It will thus be noted that the improved process of forming individual cheeses in individual molds by the utilization of heat to cause internal pressure or expansion of the cheeses within the molds to smooth the cheese surfaces, obviates the use of the large cheese forming presses which have been used heretofore.

I am aware that numerous details of my process, particularly temperatures and time periods, may be varied through a wide range without departing from the principles of this invention and I therefore do not purpose limiting the patent granted otherwise than necessitated by the prior art.

I claim as my invention:

1. The process of making cheese consisting of compressing curd to produce green cheese, dividing the green cheese into pieces, confining the pieces of green cheese under pressure in locked individual molds, and then subjecting the filled molds to heat to expand the cheese within the molds to smooth out the surfaces of the cheese.

2. The process of forming small cheeses of predetermined size, consisting of compressing pieces of green cheese within locked individual molds and subjecting the filled molds to heat to expand the pieces of cheese within the mold to fill out surface irregularities, then permitting the cheese within the molds to gradually cool, and then removing the cooled smooth cheeses from the molds and setting the same aside to be cured.

3. The process of forming a cheese consisting of compressing and locking green cheese in a mold and subjecting the filled mold to moist heat.

4. A process of forming cheese consisting of compressing curd to provide a large green cheese, dividing the large green cheese into pieces of predetermined size, compressing and locking the pieces of green cheese in individual molds, subjecting the filled molds to moist heat for a short period to cause expansion of the cheese within the molds to fill out irregularities in the surfaces of the cheese, then permitting the cheese to gradually cool in the molds, and then removing the cooled smooth cheeses from the molds and setting the removed cheeses away to be cured.

5. The process of forming a cheese consisting of compressing a green cheese into a split hoop disposed within a mold, locking the mold and then subjecting the compressed cheese while retained within the split hoop and in the mold to heat to expand the cheese to smooth out the surfaces thereof.

6. The process of forming a cheese consisting of compressing a cheese into a split hoop and then subjecting the cheese while under compression to heat.

7. The process of forming a cheese consisting of applying a wrapper on the cheese, placing the wrapped cheese in a hoop, compressing the wrapped cheese into a predetermined size into the hoop by means of a mold, then subjecting the compressed wrapped cheese to heat, and then permitting the cheese to gradually cool in the hoop and mold.

In testimony whereof I have hereunto subscribed my name in the presence of two subscribing witnesses.

JULIUS R. MEYERS.

Witnesses:
CARLTON HILL,
FRED E. PAESLER.